(No Model.)
W. C. LILLY & J. M. H. FREDERICK.
PATCH FOR PNEUMATIC TIRES.
No. 581,166. Patented Apr. 20, 1897.
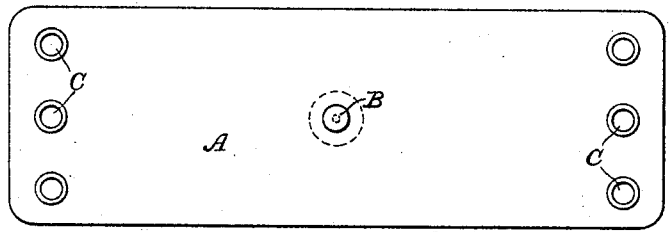
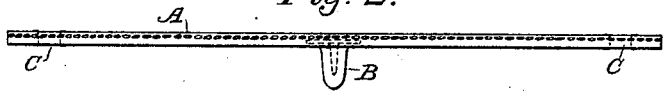
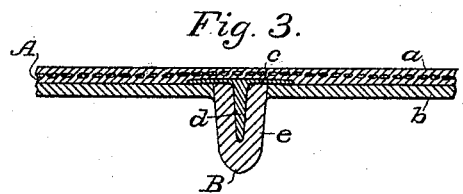
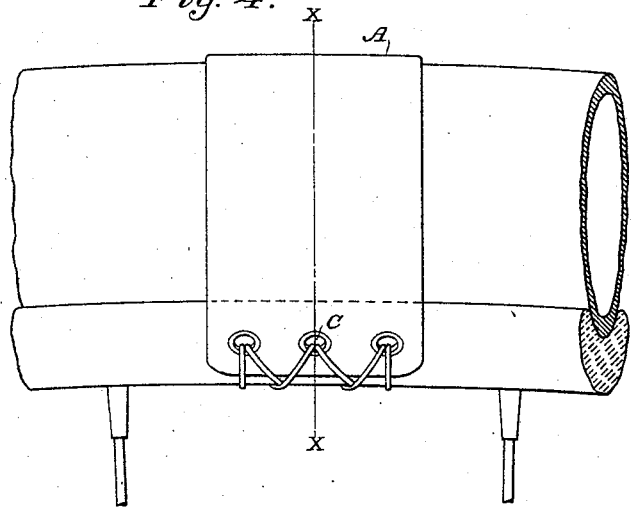
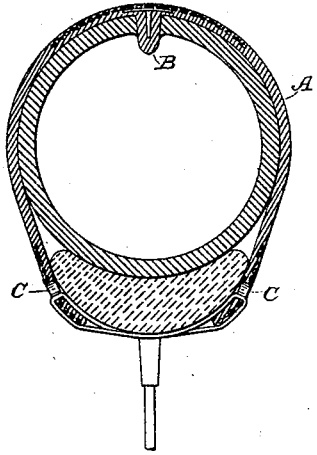
Witnesses
A. B. Robinson
Ike Isaacs
Inventors,
William C. Lilly.
James M. H. Frederick.
by Luther G. Hopper,
Attorney.

UNITED STATES PATENT OFFICE.

WILLIAM C. LILLY AND JAMES M. H. FREDERICK, OF AKRON, OHIO.

PATCH FOR PNEUMATIC TIRES.

SPECIFICATION forming part of Letters Patent No. 581,166, dated April 20, 1897.

Application filed September 1, 1896. Serial No. 604,579. (No model.)

*To all whom it may concern:*

Be it known that we, WILLIAM C. LILLY and JAMES M. H. FREDERICK, citizens of the United States, residing at Akron, in the county of Summit and State of Ohio, have invented a new and useful Patch for Repairing Pneumatic Tires, of which the following is a specification.

Our invention relates to means for repairing punctures or rents in pneumatic tires for vehicle-wheels and similar articles. Its object is to provide a simple and economical device which may be carried by the rider and quickly and easily fixed to the tire whenever a puncture occurs, thereby stopping the escape of air and enabling the rider to use the wheel at once, thus obviating the necessity of taking the wheel to a repair-shop. Although the invention is designed for temporary use, it is found that it can be used for a considerable length of time. We attain these results by the device illustrated in the accompanying drawings, in which—

Figure 1 is a plan view; Fig. 2, an edge view, and Fig. 3 an enlarged section through the central plug. Fig. 4 is a side elevation of the tire and rim of a wheel, showing the method of attaching the patch to the tire. Fig. 5 is a vertical section on line $xx$ of Fig. 4.

A is a piece of flexible material of an approximately rectangular shape, in the middle of which the plug B is securely attached. Near each end are eyelets C.

In constructing our device we prefer to use a sheet of rubber-covered canvas $a$, Fig. 3, for the outside, which is well adapted to stand the wear of the road and the strain of the lacing.

For some tires we may prefer to use canvas only at the ends surrounding the eyelet-holes and a piece above the central plug, as shown in Fig. 5, in order that the intervening elastic material may stretch and accommodate itself to any diameter of the tire-section.

Against the middle of sheet $a$ is placed the metallic disk $c$, which has the pointed projection $d$, which projection is covered with rubber $e$, as shown.

$b$ is a thin sheet of rubber of the same outer dimensions as $a$, having an aperture in its center through which the plug B is inserted, and the whole is then cemented and vulcanized together, thus forming a continuous piece completely enveloping the metallic disk and its projection.

In applying the device to a tire all that is necessary to do is to insert a suitably-sized plug B into the puncture, bend the flexible sheet A around the tire and rim, and lace the ends together firmly under the rim, or between the tire and rim, if preferred.

If desired, the plug B and sheet A may be coated with rubber cement and then applied to the tire in the same manner.

Having thus described our invention, what we claim, and desire to secure by Letters Patent, is—

1. The means of repairing pneumatic tires and similar articles, consisting of a sheet of flexible material carrying a plug B, substantially as set forth.

2. The means of repairing pneumatic tires, consisting of the combination of the sheet of flexible material, carrying the plug B, and provided with eyelet-holes for lacing or tying it to the tire, substantially as described.

3. The combination in a pneumatic-tire patch, of a sheet of rubber-covered canvas, or other flexible material, having attached to it a plug of rubber or similar material, containing a metallic core, substantially as shown.

4. The combination in a pneumatic-tire patch of the metallic disk $c$, enveloped securely in the flexible sheet A, and provided with a projection $d$, which projection is covered with rubber or similar material, substantially as described, for the purpose specified.

5. In a patch for pneumatic tires, the combination of a sheet of elastic material, such as rubber, reinforced with canvas or other strong and durable material, at the middle portion and at the ends, and having a plug attached to it near the middle, and eyelet-holes near the ends, substantially as shown.

In testimony whereof we affix our signatures, in the presence of two witnesses, at Akron, Ohio, August 28, 1896.

WILLIAM C. LILLY.
JAMES M. H. FREDERICK.

Witnesses:
ELIZABETH L. JONES,
CHAS. H. JONES.